July 21, 1964 S. P. BRICKETT ETAL 3,141,313
TORQUE-LIMITING SHAFT COUPLING ASSEMBLY
Filed Jan. 28, 1963
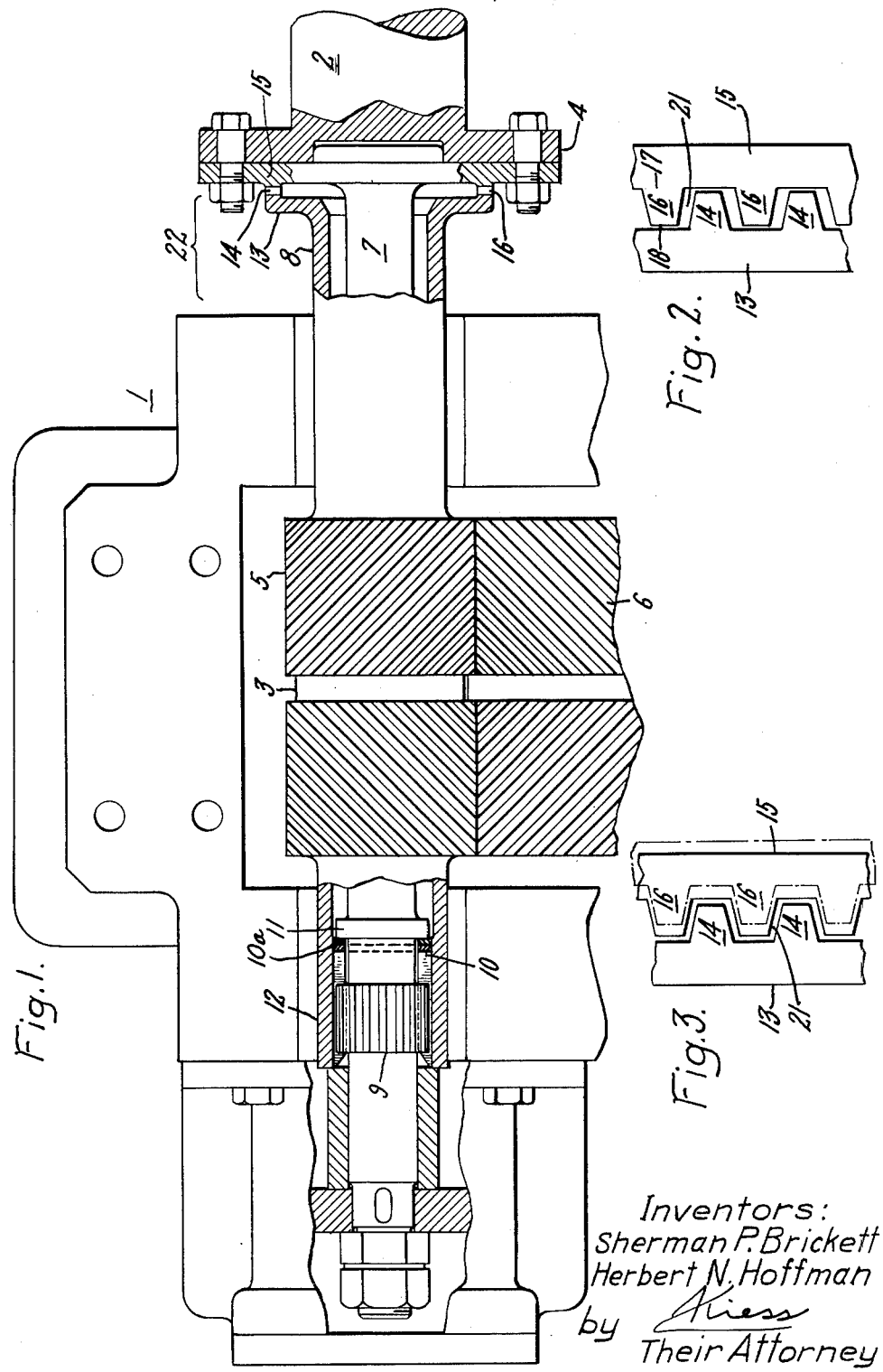
Inventors:
Sherman P. Brickett
Herbert N. Hoffman
by Kiess
Their Attorney United States Patent Office 3,141,313
Patented July 21, 1964

3,141,313
TORQUE-LIMITING SHAFT COUPLING ASSEMBLY
Sherman P. Brickett, Derry, N.H., and Herbert N. Hoffman, Lunenburg, Mass., assignors to General Electric Company, a corporation of New York
Filed Jan. 28, 1963, Ser. No. 254,338
5 Claims. (Cl. 64—27)

This invention relates to a shaft coupling assembly and, more particularly, to a variable, torque-limiting, torsionally flexible coupling assembly. While not limited thereto, the flexible coupling in this invention is particularly applicable to the coupling of turbine and gear reduction rotors in marine power plant assemblies.

The coupling of two rotating shafts in marine applications encounters the problem of possible misalignment during operation. For this reason, use of flexible couplings is almost mandatory. For instance, in the prime mover-reduction gearing assembly, each unit often has a separate casing secured to a common base. Due to the "weaving" of the ship's hull during operation, slight manufacturing errors, or to differential thermal expansion between the respective frames or rotors, misalignment between the rotor shafts is common and compensation is provided through the use of suitable flexible couplings. One type of such a coupling is a flexible quill drive shaft as disclosed in applicants' United States Patent 2,867,999 issued on January 13, 1959, and in United States Patent 2,964,929 issued to H. N. Hoffman on December 20, 1960, both of which are assigned to the assignee of the present application.

The success of the flexible quill drive shaft depends upon obtaining a sufficient degree of lateral and torsional flexibility in the shaft without overstressing it.

A torque-limiting and resilient-cushioning drive mechanism is further disclosed in Patent 2,703,847, issued to I. Kalikow, assigned to the assignee of the present application. In this type of drive, the predetermined torque applicable before the torque-limiting feature becomes operative, is fixed and cannot be varied after assembly. A preferable system would provide means for varying the predetermined torque occurring prior to engagement of the torque-limiting member, as this will allow adjustments to be made subsequent to manufacturing.

Another problem encountered in flexible coupling members and, in particular, in splined connections utilizing internal teeth disposed in the bores of rotating members, is the accumulation of foreign matter between the teeth of the coupling members. Such accumulation is produced by the centrifuging effect of the rapidly rotating members and lubricating oil which causes the heavier foreign matter to centrifuge toward the outer diameter where the cooperating teeth of the coupling members are located. This accumulation reduces the clearance between the teeth and results in excessive wear and possibly binding. Since free movement of the torque-transmitting member is essential to proper operation of the flexible coupling, means for preventing the accumulation of foreign matter is required.

Accordingly, the purpose of the present invention is to provide an improved rotor coupling assembly with increased torque transmitting capacity.

Another object is the improvement of a torque-limiting coupling member by providing means for varying the maximum torque before the torque overload protective mechanism is utilized.

A further object is to provide a plurality of independently operating systems for controlling the predetermined torque prior to engagement of the torque overload control member.

A further object is to eliminate the need for lubrication in a flexible coupling, thereby avoiding accumulation of foreign matter between the mating parts of the coupling.

A still further object is to provide a flexible coupling which requires a minimum of space, and which is easily inspected.

Further objects and advantages of this invention will be better understood from the following description referring to the accompanying drawings, and the features of novelty which characterize this invention will be pointed out with particularity in the claims annexed to and forming part of this specification.

In the drawings, FIGURE 1 is a sectional view of a power transmission assembly illustrating a flexible coupling assembly in accordance with the invention.

FIGURE 2 is a sectional view on an enlarged scale of the meshing projections of the torque limiting couple.

FIGURE 3 is a sectional view on an enlarged scale illustrating two axial positions of the meshing projections of the torque-limiting coupling.

In accordance with one embodiment of my invention, a flexible coupling comprises two coaxial, radially spaced shafts which are coupled together through a splined connection located near one end of the shafts. Face couplings, located at the other end of each shaft, have cooperating tapered projections which have relatively large circumferential clearances between them so as to permit a predetermined amount of relative angular motion prior to direct mechanical interaction of adjacent projections. This connection provides torsional flexibility and tends to absorb or reduce torsional vibrations; however, as the torque applied to the inner shaft exceeds the allowable maximum value, the inner shaft twists and the face couplings interengage one another, resulting in transmittal of the excess torque by the outer quill shaft.

The clearance between the mating parts of the face couplings is determined by the relative orientation between the shafts when they are coupled together by the splined connection, since the spacing between successive splines of the spline coupling is less than the spacing between successive teeth on the face coupling. Relative axial movement of one shaft with respect to the other will also vary the circumferential clearance between the face coupling teeth due to the tapered shape of the mating teeth.

Referring now more particularly to the drawings, the invention as illustrated in FIGURE 1 is applied to a turbine-gear unit coupling assembly indicated generally at 1. The coupling serves as a power transmitting member between an input shaft or turbine shaft 2 and a reduction gear rotor 3. The rotor drives a herringbone pinion 5 which meshes with a similar gear 6 supported in suitable bearings (not shown) and connected to drive a marine propeller, a generator or other suitable load device. Such details are unimportant to the instant invention, and the following description will pertain to the flexible coupling assembly for connecting the turbine shaft 2 to the gear reduction rotor 3. It will, of course, be understood that while the invention is discussed with relation to its use in marine assemblies, such discussion is merely for the purpose of illustration and should not be considered to be a limitation on the scope of the invention.

As shown in FIGURE 1, the coupling assembly is formed of two coaxial shafts: an inner drive shaft 7 and an outer quill shaft 8. The input shaft 2 is fixed to the shaft 7 at one end through a rigid connection 4, while the quill shaft 8 is torsionally coupled at 12 to the inner shaft 7 at a point axially displaced a substantial distance from the connection 4. The coupling 12 comprises accurately mated splines 9 and 10 formed on the outer surface of the shaft 7 and the inner surface of the quill shaft 8 respectively. These accurately mated splines provide a minimum of clearance, thus resulting in an essentially rigid torsional connection. It will be seen that the torque supplied by the input shaft 2 is transmitted to the quill shaft 8 by means of the inner shaft 7 and the spline coupling 12.

Due to the substantial axial distance between the spline connection 12 and the rigid connection 4, there will be some degree of torsional and lateral flexibility as a result of the twisting and bending which will occur in the relatively small diameter drive shaft 7. The drive shaft 7 will not be subject to failure as long as the applied torque remains below a predetermined value. However, if excessive torque is applied to the shaft 7, it might possibly fail. To provide a single shaft 7 which would be able to carry the high overload torque would require a shaft of excessive size and weight, relative to the size needed at normal torque values; and this is undesirable in the flexible coupling arrangement because, as the shaft is increased in size, its stiffness would increase, thus destroying its effectiveness as a flexible coupling member.

In the present invention, the driving shaft 7 is designed to transmit a preselected maximum overload torque. If the applied torque exceeds this maximum value, the excess torque will be transmitted by means of a torque-limiting device comprising the quill shaft 8 and a torque-limiting coupling 22. This comprises a pair of cooperating face coupling members 13, 15. Circumferentially spaced projections or teeth 16 are formed on the flange 15, which extends radially outwardly from and adjacent to the end of the drive shaft 7. These projections loosely mesh with a similar set of projections or face teeth 14 which protrude from the flange 13 on the end of shaft 8. This "face coupling" is designed so the spacing between successive teeth of one of the face coupling members exceeds in circumferential dimension the greatest width of the teeth of the cooperating member. This is illustrated in FIGURE 2, where the spacing between teeth 16 is substantially greater than the root width of teeth 14. The substantial circumferential clearance 21 thus provided between mating teeth 14, 16 determines the angle of twist permitted in the inner shaft 7.

Any torque below the predetermined maximum value which is applied to the drive shaft 7 by the input shaft 2 will be transmitted to the quill shaft 8 by the spline coupling 12. In the event of excessive overload, the excess torque above the predetermined maximum value will be transmitted from the inner shaft 7 to the quill shaft 8 through the torque-limiting face coupling 22.

A vernier method of adjusting the clearance 21 between the teeth of the face coupling 14, 16 is provided by the spline coupling 12. This is achieved by having the circumferential spacing between successive splines 9 and 10 considerably less than the spacing between projections 14 on flange 13 and between projections 16 on flange 15. Thus, relative circumferential orientation of inner shaft 7 with respect to quill shaft 8 at the spline connection 12 will vary the clearance 21 between the face teeth of the torque-limiting coupling. This can be effected by axially moving one shaft with respect to the other until the splines 9, 10 are disengaged and then rotating one shaft with respect to the other until the desired clearance 21 is obtained. Re-engaging the splines 9, 10 will then fix this desired clearance value.

A second means for varying the clearance in the torque-limiting coupling 22, and thus varying the value of overload torque receivable by the inner shaft 7 prior to engagement of the torque-limiting coupling, is provided by the shape of the teeth 14, 16. The teeth are tapered from root to tip, as they would be if cut by a gear tooth generating process, and therefore, as seen in FIGURE 3, axial movement of one set of teeth relative to the other will also vary the clearance 21. Since the torsionally rigid coupling 12 is formed by a plurality of interengaging axial splines 9, 10, shafts 7 and 8 may be moved axially with respect to one another and, thus, the clearance 21 can be varied. It will be noted that the shaft 7 has a shoulder 11 which abuts the ends of the splines 10. In order to effect relative axial movement between the two shafts, the shoulder 11 can be machined to a smaller axial length or spacer members 10a can be inserted or removed from between the shoulder 11 and the ends of splines 10. This axial adjustment of shaft 7 in quill shaft 8 permits the clearance 21 to be accurately varied, as illustrated by the broken line position of member 15 in FIGURE 3.

Because, during normal operation and even during certain overload conditions, the torque-limiting coupling 22 is not engaged, no lubrication is necessary for the torque-limiting coupling. Elimination of this lubrication also eliminates problems due to the accumulation of foreign matter, which normally would occur due to the centrifugal action of the rapidly rotating lubricant. Use of face-type coupling teeth also facilitates checking the coupling, since the coupling teeth are radially spaced from the quill shaft and are exposed to view.

This coupling arrangement also provides transverse flexibility by lateral flexing of inner shaft 7, as well as torsional flexibility, and is, therefore, particularly effective in assemblies where there may be some "offset" misalignment of the shafts. The torsional flexibility also tends to dampen torsional vibrations rather than transmitting rapid variations in torque, as would be the case in a torsionally rigid coupling.

The operation of this structure is as follows:

Torque is transmitted through the rigid bolted flange connection 4 between the turbine shaft 2 and the driving shaft 7. As long as the applied torque is below a predetermined value, the entire torque will be transmitted to shaft 8 through the torsionally rigid spline coupling 12. Angular deflection of the relatively flexible shaft 7 is in a direction such as to decrease the clearance 21 between the adjacent cooperating teeth of the torque-limiting coupling 22. This flexibility will tend to absorb rapidly changing torques, and thus prevent their destructive effects on the propulsion system which the gear reduction rotor is driving. During normal operation, there is no contact between the teeth 14, 16 and, consequently, no wear is caused, nor is a lubricant required.

In the event of excessive torque, the shaft 7 twists enough to cause engagement of the teeth 14, 16 and thus transfer excess torque through the torque-limiting coupling 22. The clearance between the face coupling teeth can be varied either by axially displacing the face teeth with respect to one another or by properly orienting the coaxial shafts circumferentially at the spline 9, 10, as described above.

While only one form of the invention has been described specifically, it will be apparent to those skilled in mechanical arts that numerous changes and substitutions of equivalents might be made. For example, other types of torsionally rigid couplings may be used in place of the spline connection 12, providing relative axial movement between the coupled shafts could still be performed.

Other modifications and substitutions will be apparent, and it is desired to cover by the appended claims all such modifications as fall within the true spirit and scope of the invention.

What is claimed as new and desired to be secured by Letters Patent of the United States is:

1. A torque-limiting quill shaft assembly comprising:
   (a) a relatively rigid hollow quill shaft,
   (b) a relatively flexible inner shaft disposed coaxially within and spaced from the quill shaft,
   (c) first coupling means connecting a first end of said flexible shaft to the adjacent first end of said quill shaft,
   (d) second coupling means for transmitting torque from the second end of the flexible shaft to the adjacent second end of the quill shaft upon occurrence of a preselected maximum torque, the second coupling means including first and second annular coupling members connected to the quill shaft and flexible shaft respectively and having circumferentially spaced interengaging projections defining substantial circumferential clearances under normal torque loads, said projections being tapered axially in opposite directions so that axial adjustment of said first and second annular coupling members relative to one another varies the circumferential clearance defined by said projections, and (e) means for adjusting the tapered projections of the first and second annular coupling members axially relative to one another to effect variation of said circumferential clearances.

2. A torque-limiting quill shaft assembly as defined in claim 1 wherein said first coupling means comprises a first and a second set of interengaging axial splines on the flexible shaft and the quill shaft respectively to allow relative axial movement while preventing relative rotational movement between said flexible shaft and said quill shaft, whereby said axial movement effects adjustment of the circumferential clearance between said interengaging projections of said second coupling means.

3. A torque-limiting quill shaft assembly as defined in claim 2 wherein the spacing between successive splines of said first set and between successive splines of said second set is unequal to the spacing between successive projections of said first annular coupling member, whereby the circumferential clearance between said interengaging projections of said second coupling means is varied by adjusting the relative circumferential orientation of the flexible shaft and the quill shaft.

4. A torque-limiting quill shaft assembly as defined in claim 3 wherein the spacing between successive splines of said first set and between successive splines of said second set is less than the spacing between successive projections of said first annular coupling member and between successive projections of said second annular coupling member.

5. A torque-limiting quill shaft assembly comprising:
(a) a hollow quill shaft,
(b) a relatively flexible inner shaft disposed coaxially within the quill shaft,
(c) first coupling means connecting a first end portion of said quill shaft to an adjacent portion of said inner shaft and comprising interengaging axial spline means on the quill shaft and inner shaft respectively, whereby the inner shaft may assume a range of axial positions relative to the quill shaft while maintaining positive driving relation therewith, (d) second coupling means spaced axially from said first coupling means and constructed to transmit torque directly to a second end portion of the quill shaft upon occurrence of a preselected amount of relative torsional displacement between the second end portion of the quill shaft and the adjacent second end portion of the inner shaft, said second coupling means comprising first and second radially extending flange members connected to said second end portions of the quill shaft and inner shaft respectively and each having a circular row of circumferentially spaced axially projecting face gear teeth, the face gear teeth of each flange member tapering axially toward and projecting into the respective spaces between adjacent teeth of the other flange member, the circumferential spacing between adjacent teeth of each flange member being substantially greater than the circumferential width of the respective mating teeth of the other flange member, whereby said interengaging tapered face gear teeth define substantial circumferential clearance spaces between mating teeth in normal operation when torque is transmitted entirely by the inner shaft, and (e) abutment means locating the inner shaft axially relative to the quill shaft to determine the depth of engagement of the tapered teeth of said second coupling means and thereby to determine the size of the circumferential clearance spaces between mating teeth of the second coupling means.

References Cited in the file of this patent
UNITED STATES PATENTS

| | | |
|---|---|---|
| 1,636,262 | Troendly | July 19, 1927 |
| 2,394,405 | Schjolin | Feb. 5, 1946 |

FOREIGN PATENTS

| | | |
|---|---|---|
| 551,932 | Belgium | Nov. 14, 1956 |